(12) United States Patent
Shutoku et al.

(10) Patent No.: US 7,289,394 B2
(45) Date of Patent: Oct. 30, 2007

(54) DATA RECORDING CONTROLLER FOR ADDING NEW DATA TO A MEDIUM

(75) Inventors: Toshiyuki Shutoku, Tsushima (JP); Shin-ichiro Tomisawa, Mizuho (JP)

(73) Assignee: Sanyo Electric Co., Ltd., Osaka (JP)

( * ) Notice: Subject to any disclaimer, the term of this patent is extended or adjusted under 35 U.S.C. 154(b) by 875 days.

(21) Appl. No.: 10/673,904

(22) Filed: Sep. 29, 2003

(65) Prior Publication Data

US 2004/0071055 A1    Apr. 15, 2004

(30) Foreign Application Priority Data

Sep. 30, 2002    (JP)    ............... 2002-284767

(51) Int. Cl.
G11B 21/08    (2006.01)
(52) U.S. Cl. .................. 369/30.1; 369/53.24
(58) Field of Classification Search .............. None
See application file for complete search history.

(56) References Cited

U.S. PATENT DOCUMENTS 6,584,053 B1    6/2003    Tsukihashi

FOREIGN PATENT DOCUMENTS

JP    2001-176197    6/2001

OTHER PUBLICATIONS

Patent Abstracts of Japan, Publication No. 06-313329, Publication Date: Nov. 8, 1994.
Patent Abstracts of Japan, Publication No. 2000-057571, Publication Date: Feb. 25, 2000.
Patent Abstracts of Japan, Publication No. 2002-230915, Publication Date: Aug. 16, 2002.
Patent Abstracts of Japan, Publication No. 2002-246901, Publication Date: Aug. 30, 2002.
Patent Abstracts of Japan, Publication No. 2002-252551, Publication Date: Sep. 6, 2002.

*Primary Examiner*—Paul W. Huber
(74) *Attorney, Agent, or Firm*—Occhiuti Rohlicek & Tsao LLP

(57) ABSTRACT

A data recording controller for properly adding data to a disc medium. The controller includes a data location counter for performing counting in synchronism with reproduction of data written to an optical disc. An LPP location counter performs counting in synchronization with reproduction of a disc address recorded to the optical disc. A detection circuit detects the difference between a data format address recorded to the optical disc and an optical disc address recorded to the optical disc from count values of the two counters. A control unit calculates a recording initiation address from the detected difference. A timing control circuit determines a timing for starting the recording of additional data from the recording initiation address.

14 Claims, 6 Drawing Sheets

DATA RECORDING CONTROLLER FOR ADDING NEW DATA TO A MEDIUM

CROSS-REFERENCES TO RELATED APPLICATIONS

This application is based upon and claims the benefit of priority from prior Japanese Patent Application No. 2002-284767 filed on Sep. 30, 2002, the entire contents of which are incorporated herein by reference.

BACKGROUND OF THE INVENTION

The present invention relates to a device for recording data to a disc medium to which data may be added, and more particularly, to a recording controller for adding new data to a disc medium, to which a disc address corresponding to a predetermined data format is recorded beforehand, from the end of previously written data.

FIGS. 1 to 3 indicate the logic format of data recorded to a digital versatile disc (DVD).

FIG. 1 shows an error correction code (ECC) block. The ECC block includes information data, which is configured by 172 columns of bytes and 192 rows of bytes. The ECC also includes an outer code parity (PO) and an inner code parity (PI). The PO is added to each of the 172 columns of bytes and has a data length of 16 rows of bytes. The PI is added to each of the 192 and 16 rows of bytes and has a data length of 10 columns of bytes.

Referring to FIG. 2, the information data of the ECC block is divided into 16 units. Each unit is referred to as a data sector, each consisting of 12 rows of data. Each of the 16 rows of the PO is sequentially moved next to one of the 16 data sectors to configure 16 recording sectors.

FIG. 3 indicates the format of a data sector. Twelve bytes of header data, which includes a data address, are added to the head of each data sector. The data sector includes 2048 bytes of main data and 4 bytes of error detection code (EDC) data.

When data is recorded to a DVD, 8 bits of data is modulated to 16 bits of data, and a synchronization signal is added to each of the sixteen bits of data to perform 8-16 modulation. The 8-16 modulation generates the modulation data of FIG. 4.

Referring to FIG. 4, a frame of DVD recording data includes 32 bits of synchronization signal data (indicated as sync) and 1456 bits of modulated data. That is, 728 bits of original data undergoes 8-16 modulation to generate 1456 bits of modulated data, and 32 bits of the synchronization signal (sync) is added to the head of the modulated data. This configures the DVD recording data frame. In the DVD, 26 frames of recording data configure a single sector. The configuration of a single sector of recording data in a DVD is shown in FIG. 4.

The modulated data is recorded along a single spiral track that extends along a disc medium. The track is a groove extending between lands in a disc. The groove slightly wobbles. A wobble signal having a predetermined cycle is extracted from the wobbling of the groove.

The disc medium includes land prepits (LPP), which contain address information, formed at predetermined intervals along the track. More specifically, an LPP is provided for each data recording region, which corresponds to two of the above frames. The address information of the LPP indicates the position of a data recording region on the disc.

Data is recorded on the data recording region in accordance with the address information of the LPP. The address information of the LPP may be used to add data to the disc medium. Data is added in the following manner.

When ending the recording of data, the address of the data is recorded as address information in a certain recording region of the disc medium. When recording additional data, the position for starting the recording is determined by referring to the address recorded in the certain recording region. The recording of the data is then started at a timing in which the spot of a laser beam emitted to the disc medium coincides with the recording initiation portion. This enables the adding of data.

The address information of the disc medium that was recorded in the certain recording region based on the LPP to indicate the position where data recording ended may not accurately indicate the position where data recording actually ended. As a result, additional data may not be properly recorded when data that has already been actually recorded does not correspond to its allocated data recording region.

FIG. 5A shows an example in which a single block of actually recorded data is longer than a data recording region allocated for a single block. In this case, the end (DE) of the recorded data exceeds the end (AE) of the recording region block of the disc medium. The recording end position of the previous data, or the address information representing the end of the data, is recorded in the certain data recording region. However, the address information corresponds to the address of the end of the data recording region allocated for a single block (AE in FIGS. 5A and 5B). Thus, when data is added based on the address information obtained from an LPP signal, data is recorded from the end (AE) of the data recording region. As a result, data is rewritten on the previously recorded data. Thus, the previously written data cannot be correctly read.

FIG. 5B shows an example in which a single block of actually recorded data is shorter than a data recording region allocated for a single block. In this case, the end (DE) of the recorded data does not reach the end (AE) of the recording region block of the disc medium. Thus, when data is added based on the address information obtained from an LPP signal, data is recorded from the end (AE in FIG. 5B) of the recording region. In this case, a vacant region is formed between the previously recorded data and the head of the added data. As a result, data becomes non-continuous.

SUMMARY OF THE INVENTION

One aspect of the present invention is a data recording controller for recording data to a disc medium to which a disc address corresponding to a predetermined data format is recorded beforehand, in compliance with the data format, together with a data address and recording additional data from an end of data that has already been written. The data recording controller includes a detection circuit for detecting a difference between the data address and the disc address obtained by reading the written data. A timing control circuit determines a timing for initiating the recording of the additional data based on the difference.

Another aspect of the present invention is a data recording controller for recording data to a disc medium to which a disc address corresponding to a predetermined data format is recorded beforehand, in compliance with the data format, together with a data address and recording additional data from an end of data that has already been written. The data recording controller includes a first counter for performing counting in synchronism with reproduction of the written data. A second counter performs counting in synchronism with reproduction of the disc address. A detection circuit is connected to the first and second counters. The detection circuit compares count values of the two counters to detect a difference between the data address and the disc address obtained by reading the written data. A timing control circuit determines a timing for initiating the recording of the additional data based on the difference so that the additional data is added from the end of the written data.

A further aspect of the present invention is a device for recording data in compliance with a predetermined format to a disc medium and a disc address on the disc medium indicating a position of written data on the disc medium. The device including an optical head for generating a laser beam, a first read signal related to the written data, and a second read signal related to the disc address by emission of the laser beam for reading data from the disc medium. A data recording controller is connected to the optical head to control the recording of data, including the recording of additional data continuously from an end of the written data. The data recording controller includes a detection circuit for detecting a difference between a data format address of the written data and the disc address from the first read signal and the second read signal. A timing control circuit controls a timing for initiating the recording of the additional data based on the difference detected by the detection circuit so that the additional data is added from the end of the written data.

Other aspects and advantages of the present invention will become apparent from the following description, taken in conjunction with the accompanying drawings, illustrating by way of example the principles of the invention.

BRIEF DESCRIPTION OF THE PREFERRED EMBODIMENTS

DETAILED DESCRIPTION OF THE PREFERRED EMBODIMENTS

A data recording controller 100 according to a preferred embodiment of the present invention will now be discussed. The data recording controller 100 is incorporated in a data recorder 200 for recording data to an optical disc (DVD) 40.

Figure 1:
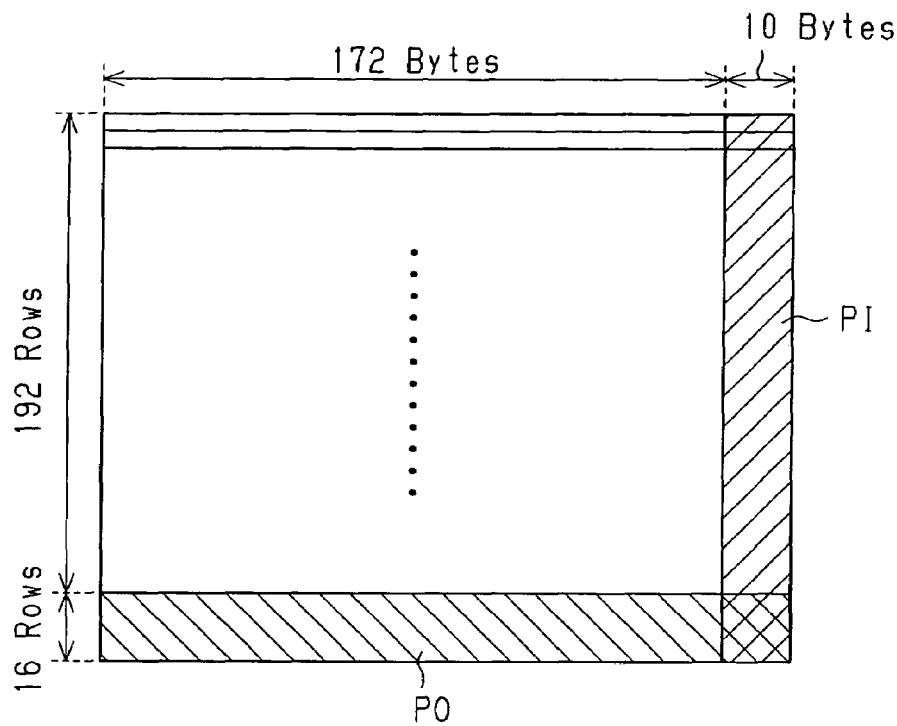
FIGS. 1 to 3 are diagrams showing the format of data in a DVD.
Figure 2:
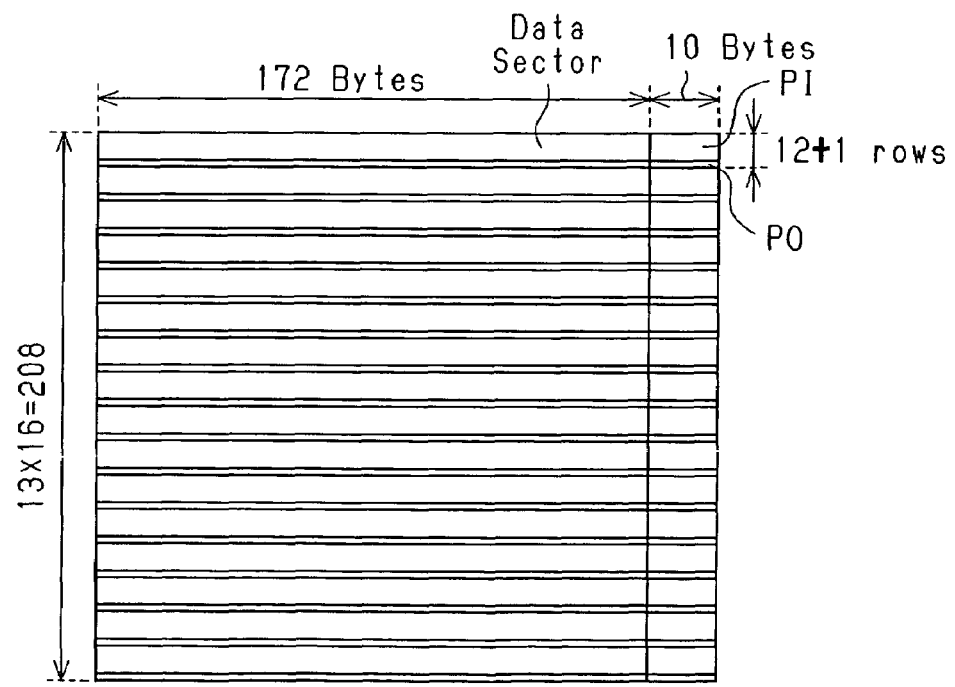
Figure 3:
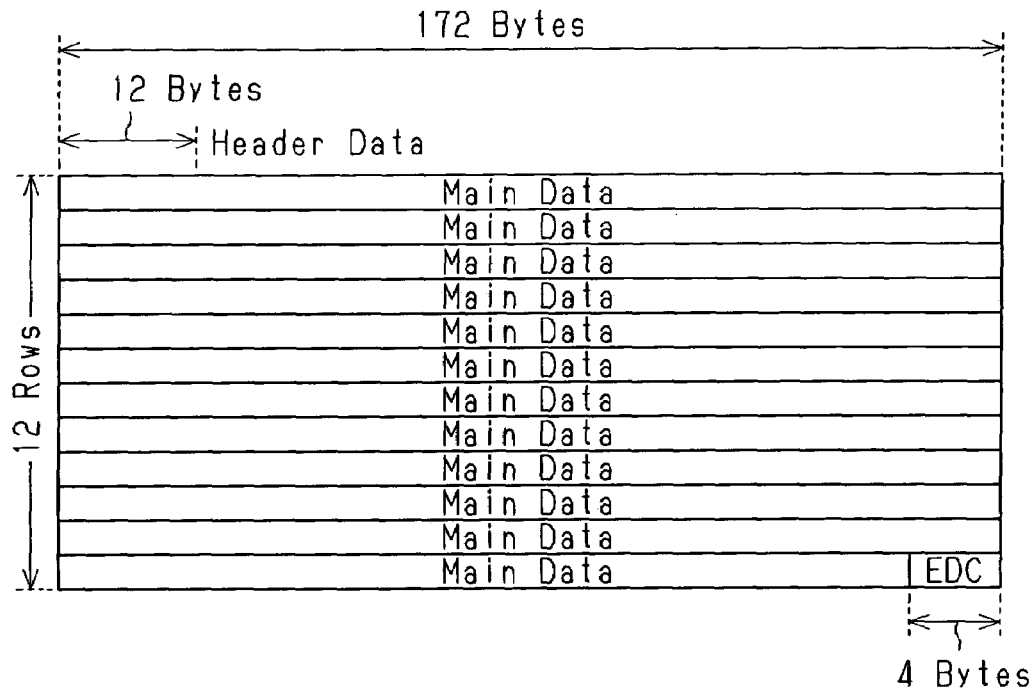
Figure 4:
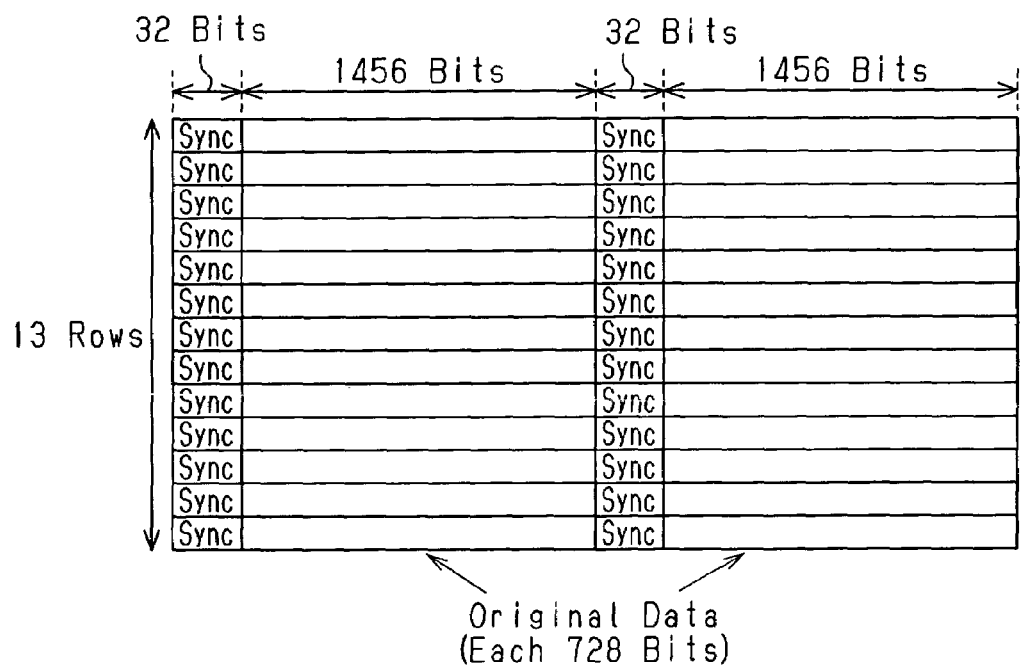
FIG. 4 is a diagram illustrating the format of modulated data in a DVD.
Figure 5A:
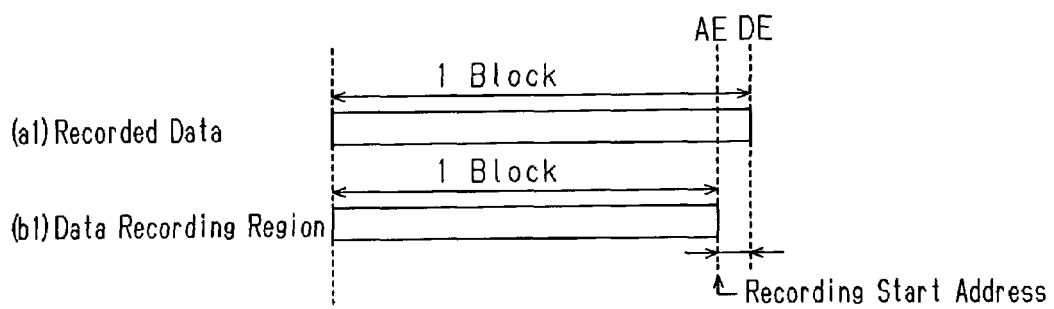
FIGS. 5A and 5B are diagrams showing the relationship between the recording region of an optical disc and the data recorded to the recording region.
Figure 5B:
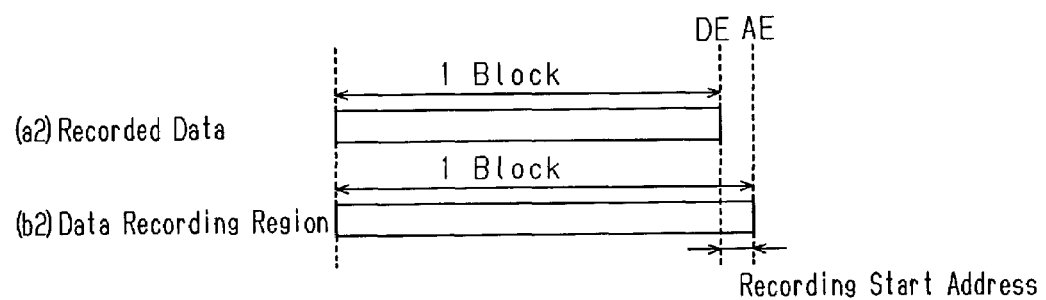
Figure 6:
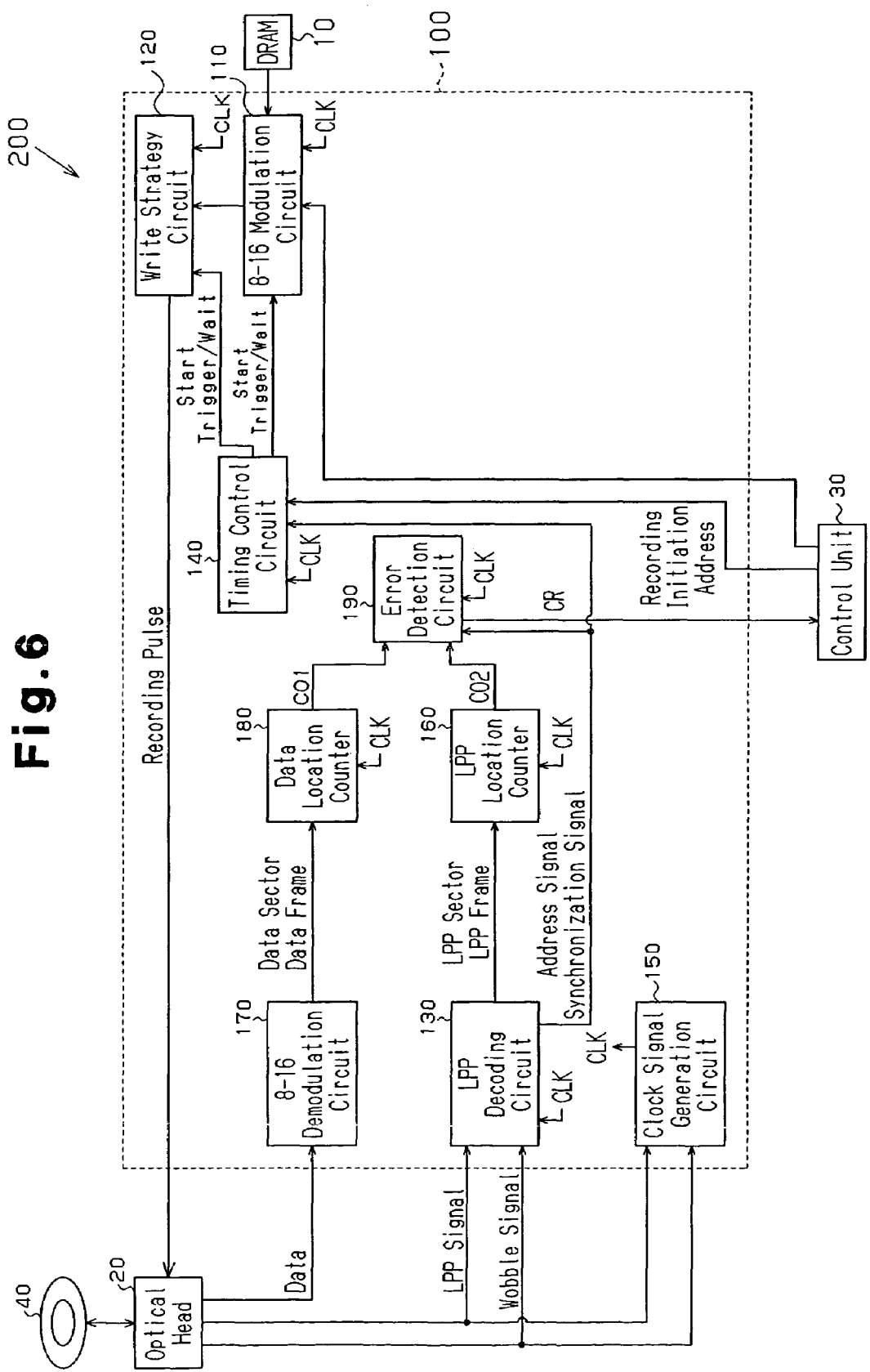
FIG. 6 is a block diagram illustrating a data recording controller according to a preferred embodiment of the present invention.

Referring to FIG. 6, the data recording controller 100 retrieves the data stored in a DRAM 10, generates a recording pulse corresponding to the data, and provides the recording pulse to an optical head 20. The data recorder 200 includes a control unit 30, which has a microcomputer (not shown) for controlling various sections of the data recorder 200. The control unit 30 provides the data recording controller 100 with address information of data that is subject to recording, that is, an address in the DRAM 10, and an address of the optical disc 40 that corresponds to an initiation timing for recording.

The data recording controller 100 will now be discussed.

An 8-16 modulation circuit 110 converts data, which is encoded in a DVD format, to modulated data, which is the data actual recorded to an optical disc 40.

A write strategy circuit 120 performs a predetermined pulse conversion on the modulated data output from the 8-16 modulation circuit 110 to generate a recording pulse, which controls the intensity and emission time of a laser beam. The write strategy circuit 120 then provides the recording pulse to an external circuit, such as the optical head 20. Japanese Laid-Open Patent Publication No. 6-313329 and Japanese Laid-Open Patent Publication No. 2000-57571 describes examples of a write strategy circuit.

The optical head 20 generates recording laser beam based on the recording pulse and emits the recording laser beam to the optical disc 40. The optical head 20 functions to receive the reflection of the laser beam, which is used to reproduce or record data. The optical head 20 retrieves recorded data, an LPP signal, and a wobble signal from the optical disc 40 through the laser beam reflection and provides the data recording controller 100 with the retrieved data and signals.

The data recording controller 100 detects the position of the laser beam emitted to the optical disc 40. More specifically, an LPP decoding circuit 130 decodes the LPP signal and the wobble signal to generate a synchronization signal and an address signal. The synchronization signal corresponds to the region in which data is recorded in frame units. The address signal indicates the address in sector units of the data recording region in the optical disc 40. The address signal and the synchronization signal are used to detect the position of a laser beam on the optical disc 40.

A timing control circuit 140 controls recording so that new data is recorded at a timing in which the position of the laser beam detected from the address signal or the synchronization signal reaches a desired position (recording initiation position).

A clock signal generation circuit 150 generates a clock signal CLK from the LPP signal and the wobble signal output from the optical head 20. More specifically, the clock signal generation circuit 150 generates the clock signal CLK from the wobble signal and then uses the LPP signal to finely adjust the frequency of the clock signal CLK to a predetermined frequency. A PLL circuit (not shown) finely adjusts the frequency. Japanese Laid-Open Patent Publication No. 2002-230915, Japanese Laid-Open Patent Publication No. 2002-246901 and Japanese Laid-Open Patent Publication No. 2002-252551 describes examples of a PLL circuit. The clock signal generation circuit 150 may generate the clock signal CLK from only one of the wobble and LPP signals instead of from both signals.

The modulation circuit 110, the write strategy circuit 120, the LPP decoding circuit 130, the timing control circuit 140, and an error detection circuit 190 are all operated in accordance with the clock signal CLK. Accordingly, the modulation circuit 110, the write strategy circuit 120, the LPP decoding circuit 130, and the timing control circuit 140 operate in accordance with the controlled rotation of the optical disc 40.

In accordance with a recording initiation address provided from the control unit 30, the timing control circuit 140 controls the operation timing of the write strategy circuit 120 and the 8-16 modulation circuit 110. For example, the timing control circuit 140 instructs the modulation circuit 110 to start data modulation at a timing that is ahead of the timing in which the laser beam reaches the data recording initiation position by the total of the time required for modulating data, the time required for generating the recording pulse, and a predetermined margin time. Further, the timing control circuit 140 instructs the 8-16 modulation circuit 110 and the write strategy circuit 120 to hold the recording pulse that is to be actually recorded (i.e., delay before outputting the recording pulse) with the write strategy circuit 120 until the laser beam reaches the data recording initiation position.

As a result, when the modulation circuit 110 completes modulation and the write strategy circuit 120 completes the conversion of modulated data to a recording pulse, the laser beam is located ahead of the recording initiation position.

The timing control circuit 140 causes a start trigger signal to go high at a timing in which the laser beam reaches the recording initiation position to re-activate the write strategy circuit 120 and the modulation circuit 110.

In the preferred embodiment, the data recording controller 100 includes an error detection circuit that compares a data format address of the data recorded to the optical disc 40 with a disc address indicating where the data is recorded to detect the difference between the two addresses.

An LPP location counter 160 is operated in synchronism with a reproduction operation of the disc address and counts a sector synchronization signal of a disc address (LPP sector), which is designated in sector units, or a frame synchronization signal of a disc address (LPP frame), which is designated in frame units. The LPP location counter 160 includes an internal PLL, which generates a clock signal having a cycle that is shorter than the read cycle of the frame synchronization signal, and an internal counter, which increments its count value at a constant cycle. The internal PLL generates a clock signal having a cycle that is 1/1488 of the read cycle of the frame synchronization signal (one frame having 1488 bits). The internal counter counts the output (clock signal) of the internal PLL. This counts the disc address in bit units with the internal counter. The count value of the internal counter is reset for every single frame period. Accordingly, the disc address is counted in bit units during the period of one frame. The cycle of the clock signal generated by the internal PLL is not limited to 1/1488 of the frame synchronization signal and may be 1/744 or 1/496 of the frame synchronization signal. In such cases, the internal counter counts the disc address in units of multiple bits. For example, when the clock signal cycle is 1/744 of the frame synchronization signal, the internal counter counts the disc address in units of two bits. When the clock signal cycle is 1/496 of the frame synchronization signal, the internal counter counts the disc address in units of three bits. Further, the internal counter may be reset for every sector instead of every frame.

The optical head 20 picks up the data written to the optical disc 40 and provides a reproduction signal of the data to an 8-16 demodulation circuit 170. The 8-16 demodulation circuit 170 demodulates the reproduction signal and extracts a synchronization signal from a data address designated for a sector (data sector) or a frame (data frame).

A data location counter 180 operates in synchronism with the reproduction of the data written to the optical disc 40 and counts the synchronization signal in units of frames or sectors. In the same manner as the LPP location counter 160, the data location counter 180 includes an internal PLL and an internal counter and counts written data in units of bits or units of multiple bits. The count value CO1 of the data location counter 180 is reset in synchronism with every frame unit or every sector unit.

The error detection circuit 190 uses a count value CO1 of the data location counter 180 and a count value CO2 of the LPP location counter 160 to detect the difference between a data address and a disc address. The information of the detected information is provided to the control unit 30.

The addition of data to the optical disc 40 will now be discussed.

Figure 7:
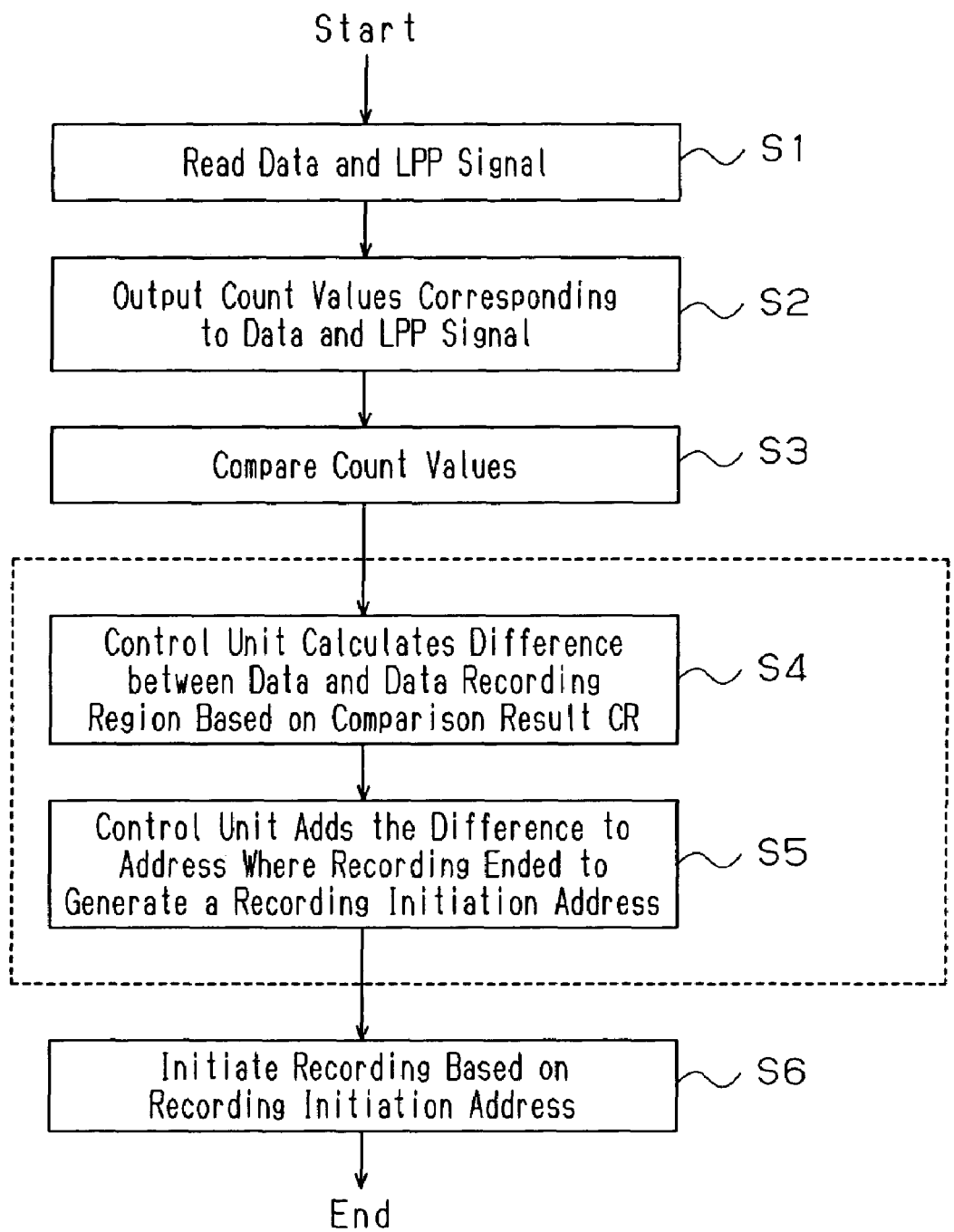
FIG. 7 is a flowchart illustrating the procedures for adding data in the preferred embodiment.

Referring to the flowchart of FIG. 7, in step S1, the optical head 20 reads the data recorded at the position of the rotating optical disc 40 to which the laser beam is emitted and provides the read data to the data recording controller 100. In other words, the optical head 20 provides the 8-16 demodulation circuit 170 with the reproduction signal of the data recorded on the optical disc 40 and provides the LPP decoding circuit 130 with the LPP signal generated from an LPP of the optical disc 40.

The 8-16 demodulation circuit 170 operates in accordance with a clock signal that differs from the clock signal CLK and provides the data location counter 180 with a data sector or a data frame. Based on the data sector or the data frame, the data location counter 180 counts the address of the data at the position where the laser beam is located in synchronism with the clock signal CLK in units of frames, sectors, bits, or multiple bits. The 8-16 demodulation circuit 170 and the data location counter 180 operate asynchronously from each other.

The LPP decoding circuit 130 provides the LPP location counter 160 with an LPP sector or an LPP frame. Based on the LPP sector or the LPP frame and in synchronism with the operation clock of the clock signal generation circuit 150, the LPP location counter 160 counts the optical disc address at the position where the laser beam is located in units of frames, sectors, bits, or multiple bits.

In step S2, the error detection circuit 190 is provided with the count value CO1 of the data location counter 180 and the count value CO2 of the LPP location counter 160.

In step S3, the error detection circuit 190 compares the count value CO1 and the count value CO2 and provides the control unit 30 with the comparison result CR. The comparison result CR is used as information indicating the difference between the data address of the data recorded to the optical disc 40 and the disc address of the optical disc 40 at where the data is recorded. The disc address is recorded to a certain recording region of the optical disc 40 when writing data to the optical disc 40.

In step S4, based on the comparison result CR provided from the error detection circuit 190 in real time, the control unit 30 calculates the difference between the data address of the data recorded to the optical disc 40 and the disc address of the optical disc 40 at where the data is recorded.

Figure 8:
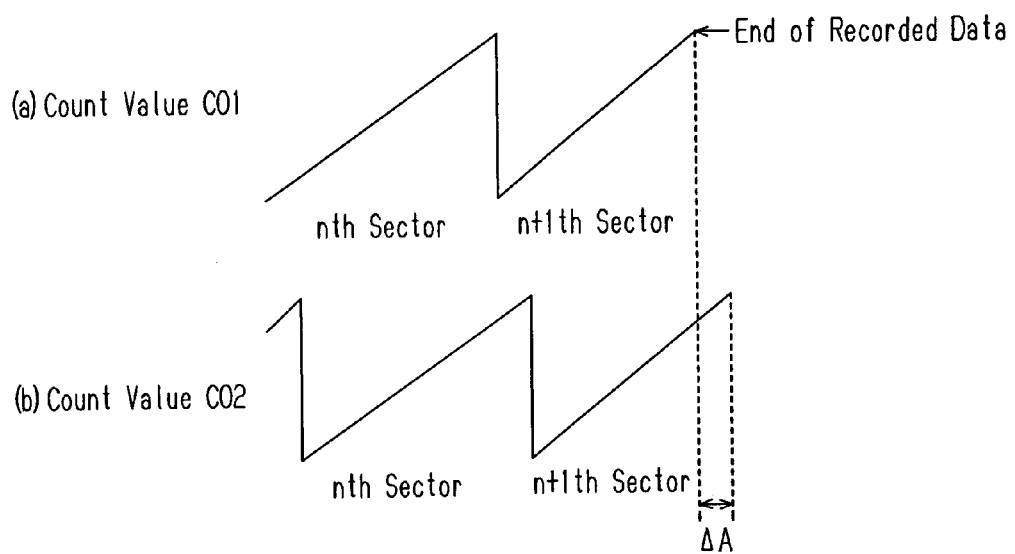
FIG. 8 is a time chart illustrating the difference between an LPP address and a data address.

For example, referring to FIG. 8, when provided with the count value CO1 and the count value CO2 in real time (operation clock unit), the error detection circuit 190 compares the two count values CO1 and CO2 at predetermined intervals (whenever the LPP synchronization signal is input) and provides the control unit 30 with the comparison result CR. Based on the comparison result CR related with the end of the data recorded to the optical disc 40, the control unit 30 calculates the difference between the end of the data recorded to the optical disc 40 and the recording position of the optical disc 40 corresponding to the end of the data (indicated as ΔA in FIG. 8).

The difference between the data address of the data recorded to the optical disc 40 and the disc address of the optical disc 40 may be compared at positions other than the end of the data.

Figure 9:
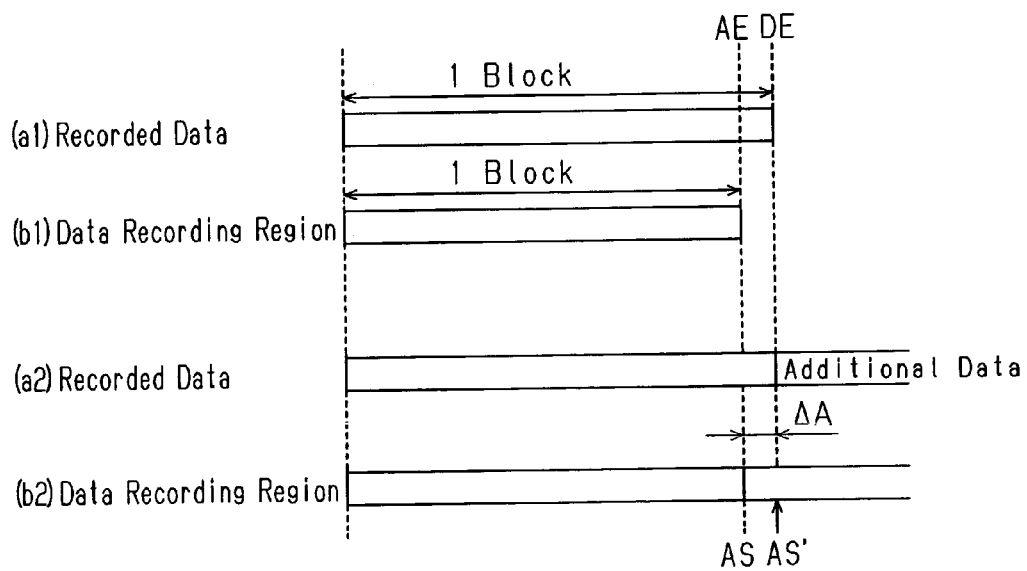
FIG. 9 is a diagram showing the relationship between the recording region of an optical disc and the data recorded to the recording region.

Referring to FIG. 9, an example in which a block of data recorded to the optical disc 40 is longer than a data recording region allocated to a single block in the optical disc 40 will now be described. In such a case, as shown in (a1), the end (DE) of the recorded data exceeds the end (AE) of the data recording region allocated for a single block in the optical disc 40. The control unit 30 calculates the difference (address difference ΔA) between the end (DE) of the recorded data and the end (AE) of the data recording region allocated for a single block.

In step S5, the control unit 30 adds the calculated address difference ΔA to a disc address AS that has been held to add data and sets a recording initiation disc address (compensated disc address) AS'. The control unit 30 provides the timing control circuit 140 with the recording initiation address AS' and provides the 8-16 modulation circuit 110 with the data address from which to start the adding of data. In accordance with the data address, the 8-16 modulation circuit 110 retrieves the data that is to be added from the DRAM 10 and modulates the data.

In step S6, the timing control circuit 140 controls the timing for initiating recording based on the recording initiation disc address AS'. More specifically, the optical head 20 starts emitting the laser beam to the rotating optical disc 40 from a position ahead of the recording initiation disc address AS'. Further, the timing control circuit 140 calculates how many disc addresses the laser beam would advance during the total of the time required for modulating data having a constant number of bytes (e.g., one word) and the time required for the modulated data to be converted to a recording pulse. The calculated number of disc addresses is subtracted from the disc address corresponding to the recording initiation timing provided from the control unit 30. This obtains the disc address from which modulation is actually started. Then, the number of addresses corresponding to a predetermined margin time is subtracted from the disc address corresponding to where modulation is actually started to obtain a modulation initiation disc address. When the disc address read from the optical disc 40 reaches the modulation initiation address, the start trigger signal goes high. Accordingly, the modulation circuit 110 starts modulation at a timing that is earlier than that in the prior art.

The control unit 30 may calculate the number of disc addresses the laser beam advances during the modulation time and the recording pulse generation time. In such a case, the control unit 30 subtracts the address calculated from the recording initiation position to generate the disc address from which modulation is actually initiated.

The timing control circuit 140 sends a wait command to the write strategy circuit 120 and the 8-16 modulation circuit 110 when the total of the time required for modulating data having a constant number of bytes and the time required for converting the modulated data to a recording pulse elapses after the 8-16 modulation circuit 110 starts modulation. In response to the wait command, the 8-16 modulation circuit 110 temporarily suspends modulation, and the write strategy circuit 120 waits in a state in which the data that is to be added is held.

When the position of the laser beam on the optical disc 40 reaches the recording initiation address, the timing control circuit 140 causes the start trigger signal to go high again. In response to the start trigger signal, the write strategy circuit 120 and the 8-16 modulation circuit 110 are reactivated to start adding data.

By performing the above series of processes, new data is continuously added from the end of data recorded to the optical disc 40 as shown in (a2) and (b2) of FIG. 9.

The preferred embodiment has the advantages described below.

(1) The error detection circuit 190 detects the difference between the data address of the data recorded to the optical disc 40 and the disc address at which the data is actually recorded. The detected difference is used to add new data continuously from the end of data that was previously recorded on the optical disc 40.

(2) The data location counter 180 counts the data address of the data recorded at where the laser beam is located in units of bits or multiple bits. The LPP location counter 160 counts the disc address of where the laser beam is located in units of bits or multiple bits. This enables the error detection circuit 190 to detect the difference between the data address of the data recorded to the optical disc 40 and the disc address of the position at which the data is actually recorded in units of bits or multiple bits.

(3) The timing control circuit 140 instructs the write strategy circuit 120 to hold the recording pulse of the additional data and wait until the laser beam reaches the recording initiation position. This ensures that the recording of data is accurately started at a timing in which the laser beam reaches the recording initiation position even if the rotation speed of the optical disc 40 changes or the pickup of the optical head 20 sways sideward.

(4) Based on the information provided from the error detection circuit 190 (i.e., comparison result), the control unit 30 sets the address of the optical disc 40 from which the adding of data is started. Since the data recording controller 100 is located outside the control unit 30, the data recording controller 100 is simple and compact. This also reduces the calculation load applied to the data recording controller 100.

It should be apparent to those skilled in the art that the present invention may be embodied in many other specific forms without departing from the spirit or scope of the invention. Particularly, it should be understood that the present invention may be embodied in the following forms.

A data recording controller may be provided with a function for calculating the address from which to start recording based on the two addresses detected by the error detection circuit 190.

In addition to the DVD, an optical disc such as a compact disc-recordable (CD-R) or a magneto-optic disk such as an MO or a mini disc (MD) may be used.

The present examples and embodiments are to be considered as illustrative and not restrictive, and the invention is not to be limited to the details given herein, but may be modified within the scope and equivalence of the appended claims.

What is claimed is:

1. A data recording controller for recording data to a disc medium to which a disc address corresponding to a predetermined data format is recorded at a certain recording region of the disc medium beforehand, in compliance with the data format, together with a data address and recording additional data from an end of data that has already been written, the data recording controller comprising:

a detection circuit for detecting a difference between the data address and the disc address obtained by reading the written data; and a timing control circuit for correcting the disc address based on the difference and determining a timing for initiating the recording of the additional data using the corrected disc address.

2. A data recording controller for recording data to a disc medium to which a disc address corresponding to a predetermined data format is recorded beforehand, in compliance with the data format, together with a data address and recording additional data from an end of data that has already been written, the data recording controller comprising:
- a detection circuit for detecting a difference between the data address and the disc address obtained by reading the written data; and
- a timing control circuit for determining a timing for initiating the recording of the additional data based on the difference,
- wherein the data recording controller is connected to a control unit for generating a recording initiation address in which the difference is compensated for and providing the recording initiation address to the timing control circuit, and the timing control circuit generates a start trigger signal in accordance with the recording initiation address.

3. The data recording controller according to claim 2, wherein the data recording controller is for use with a laser beam, the data recording controller further comprising:
- a modulation circuit activated in response to the start trigger signal to perform a predetermined conversion process on the additional data and generate modulated data; and
- a write strategy circuit activated in response to the start trigger signal and generating a recording pulse in accordance with the modulated data, wherein the recording pulse is used to generate the laser beam for recording data in which the laser beam is emitted to the disc medium.

4. The data recording controller according to claim 3, wherein the data recording controller is for use with a laser beam for reading and recording data, and the timing control circuit temporarily suspends the operations of the modulation circuit and the write strategy circuit until the laser beam for reading the written data reaches the end of the written data and restarts the operations of the modulation circuit and the write strategy circuit at a timing in which the laser beam reaches a position designated by the recording initiation address.

5. A data recording controller for recording data to a disc medium to which a disc address corresponding to a predetermined data format is recorded beforehand, in compliance with the data format, together with a data address and recording additional data from an end of data that has already been written, the data recording controller comprising:
- a first counter for performing counting in synchronism with reproduction of the written data;
- a second counter for performing counting in synchronism with reproduction of the disc address; and
- a detection circuit connected to the first and second counters, wherein the detection circuit compares count values of the two counters to detect a difference between the data address and the disc address obtained by reading the written data; and
- a timing control circuit for determining a timing for initiating the recording of the additional data based on the difference so that the additional data is added from the end of the written data.

6. The data recording controller of claim 5, wherein the data format includes a frame having a predetermined number of bits, a sector having a predetermined number of the frames, and a block having a predetermined number of the sectors, and a synchronization signal is applied to the written data and the disc address for every unit of one of the frames, the sectors, and the blocks, the first counter counting the synchronization signal of the written data, and the second counter counting the synchronization signal of the second counter.

7. The data recording controller according to claim 5, wherein the data format includes a frame having a predetermined number of bits, a sector having a predetermined number of the frames, and a block having a predetermined number of the sectors, the first counter counting the written data in predetermined bit units, and the second counter counting the disc address in predetermined bit units.

8. The data recording controller according to claim 5, wherein the data recording controller is for use with a laser beam for reading and recording data and for connection to a control unit for generating a recording initiation address in which the difference is compensated for and providing the recording initiation address to the timing control circuit, the timing control circuit generating a start trigger signal in accordance with the recording initiation address, the data recording controller further comprising:
- a modulation circuit performing a predetermined conversion process on the additional data to generate modulated data; and
- a write strategy circuit for generating a recording pulse in accordance with the modulated data, wherein the recording pulse is used to generate the laser beam for recording data by emission onto the disc medium, the modulation circuit and the write strategy circuit being activated in response to the start trigger signal.

9. The data recording controller according to claim 8, wherein the timing control circuit temporarily suspends the operations of the modulation circuit and the write strategy circuit until the laser beam for reading the written data reaches the end of the written data and restarts the operations of the modulation circuit and the write strategy circuit at a timing in which the laser beam reaches a position designated by the recording initiation address so that the laser beam for recording data is output.

10. A device for recording data in compliance with a predetermined format to a disc medium and a disc address on the disc medium indicating a position of written data on the disc medium, the device comprising:
- an optical head for generating a laser beam, a first read signal related to the written data, and a second read signal related to the disc address by emission of the laser beam for reading data from the disc medium;
- a data recording controller connected to the optical head to control the recording of data, including the recording of additional data continuously from an end of the written data, the data recording controller including:
  - a detection circuit for detecting a difference between a data format address of the written data and the disc address from the first read signal and the second read signal; and
  - a timing control circuit for controlling a timing for initiating the recording of the additional data based on the difference detected by the detection circuit so that the additional data is added from the end of the written data.

11. The device according to claim 10, further comprising a control unit connected to the detection circuit and the timing control circuit to generate a recording initiation disc address based on the difference and provide the timing control circuit with the recording initiation disc address.

12. The device according to claim 11, wherein the timing control circuit generates a start trigger signal from the recording initiation disc address and the second read signal, the data recording controller further including:

a modulation circuit for performing a predetermined conversion process on the additional data to generate modulated data; and a write strategy circuit for generating a recording pulse in accordance with the modulated data, wherein the recording pulse is used to generate the laser beam for recording data by emission onto the disc medium, the modulation circuit and the write strategy circuit being activated in response to the start trigger signal.

13. The device according to claim 12, wherein the timing control circuit temporarily suspends the operations of the modulation circuit and the write strategy circuit until the laser beam for reading data reaches the end of the written data and restarts the operations of the modulation circuit and the write strategy circuit at a timing in which the laser beam for reading data reaches a position designated by the recording initiation address so that the laser beam for recording data is output.

14. The device according to claim 13, wherein the control unit provides the modulation circuit with a memory address of the additional data.

* * * * *